US010956221B2

(12) United States Patent
Aronovich et al.

(10) Patent No.: US 10,956,221 B2
(45) Date of Patent: Mar. 23, 2021

(54) ESTIMATING RESOURCE REQUESTS FOR WORKLOADS TO OFFLOAD TO HOST SYSTEMS IN A COMPUTING ENVIRONMENT

(71) Applicant: INTERNATIONAL BUSINESS MACHINES CORPORATION, Armonk, NY (US)

(72) Inventors: Lior Aronovich, Thornhill (CA); Priya Unnikrishnan, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 153 days.

(21) Appl. No.: 16/199,850

(22) Filed: Nov. 26, 2018

(65) Prior Publication Data

US 2020/0167195 A1 May 28, 2020

(51) Int. Cl.
G06F 9/46 (2006.01)
G06F 9/50 (2006.01)
H04L 29/08 (2006.01)

(52) U.S. Cl.
CPC .......... G06F 9/505 (2013.01); G06F 9/5038 (2013.01); H04L 67/10 (2013.01)

(58) Field of Classification Search
None
See application file for complete search history.

(56) References Cited

U.S. PATENT DOCUMENTS

| 6,003,061 | A  | 12/1999 | Jones et al. |
| 8,060,543 | B1 | 11/2011 | Ciot |
| 8,312,460 | B1 * | 11/2012 | Blanding ............... G06F 9/505 |
|  |  |  | 718/104 |
| 8,612,785 | B2 | 12/2013 | Brown et al. |
| 8,719,415 | B1 | 5/2014 | Sirota et al. |
| 8,838,801 | B2 | 9/2014 | Alapati et al. |
| 9,697,045 | B2 | 7/2017 | Amaral et al. |
| 9,841,962 | B2 | 12/2017 | Whitney et al. |

(Continued)

FOREIGN PATENT DOCUMENTS

| CN | 102801792 | 11/2012 |
| CN | 106446959 | 2/2017 |
| WO | WO2017124981 | 1/2017 |

OTHER PUBLICATIONS

Notice of Allowance dated Jun. 5, 2020, pp. 13, for U.S. Appl. No. 16/199,944.
Office Action dated Apr. 24, 2020, pp. 29, for U.S. Appl. No. 16/199,903.
S. Bhanujan, et al. "Mechanism for Automated Provisioning of a Cloudswitch and a Federated Virtual Data Center or Cloud Bursts", IP.com, IP.com No. IPCOM000218490D, Jun. 5, 2012, pp. 7.

(Continued)

*Primary Examiner* — Gregory A Kessler
(74) *Attorney, Agent, or Firm* — David W. Victor; Konrad Raynes Davda & Victor LLP

(57) ABSTRACT

Provided are a computer program product, system, and method for estimating resource requests for workloads to offload to host systems in a computing environment. A calculation is made required resources of computational resources required to complete processing a plurality of unfinished workloads that have not completed. A determination is made of allocated resources that are not yet provisioned to workloads. The required resources are reduced by the allocated resources not yet provisioned to determine resources to provision. The resources to provision for the unfinished workloads are requested.

26 Claims, 10 Drawing Sheets

(56) References Cited

U.S. PATENT DOCUMENTS

| | | | |
|---|---|---|---|
| 10,250,451 | B1 | 4/2019 | Moghe et al. |
| 10,255,165 | B2 | 4/2019 | Conti et al. |
| 10,417,043 | B1 | 9/2019 | Braverman et al. |
| 10,423,461 | B2 | 9/2019 | Sanghavi et al. |
| 2001/0025310 | A1 | 9/2001 | Krishnamurthy et al. |
| 2008/0216077 | A1 | 9/2008 | Emani et al. |
| 2011/0137805 | A1 | 6/2011 | Brookbanks et al. |
| 2011/0176407 | A1 | 7/2011 | Campbell |
| 2011/0307570 | A1 | 12/2011 | Speks |
| 2012/0053925 | A1 | 3/2012 | Geffin et al. |
| 2012/0331147 | A1 | 12/2012 | Dutta et al. |
| 2013/0007762 | A1* | 1/2013 | Krishnamurthy ..... G06F 9/5044 718/104 |
| 2013/0185433 | A1 | 7/2013 | Zhu et al. |
| 2013/0262684 | A1 | 10/2013 | Kollur |
| 2013/0346994 | A1 | 12/2013 | Chen et al. |
| 2014/0229701 | A1* | 8/2014 | Jaquet ................... G06F 3/0665 711/171 |
| 2014/0282520 | A1 | 9/2014 | Sabharwal |
| 2014/0351893 | A1 | 11/2014 | Corddry et al. |
| 2014/0379722 | A1 | 12/2014 | Mysur et al. |
| 2015/0135185 | A1 | 5/2015 | Sirota et al. |
| 2015/0160884 | A1 | 6/2015 | Scales et al. |
| 2015/0249579 | A1 | 9/2015 | Ellsworth et al. |
| 2015/0261577 | A1 | 9/2015 | Gilbert et al. |
| 2016/0323377 | A1 | 11/2016 | Einkauf et al. |
| 2017/0123837 | A1 | 5/2017 | Ghosh et al. |
| 2017/0123929 | A1 | 5/2017 | Helleren |
| 2017/0293501 | A1 | 10/2017 | Barapatre et al. |
| 2017/0324810 | A1 | 11/2017 | Billore et al. |
| 2017/0331705 | A1 | 11/2017 | Jiang et al. |
| 2017/0337279 | A1 | 11/2017 | Babu et al. |
| 2017/0366606 | A1 | 12/2017 | Ben-Shaul et al. |
| 2018/0060402 | A1 | 3/2018 | Fabjanski et al. |
| 2018/0121249 | A1 | 5/2018 | Sanghavi et al. |
| 2018/0287801 | A1* | 10/2018 | Donlan ................... G06F 21/78 |
| 2018/0329757 | A1 | 11/2018 | Patgar et al. |
| 2020/0167204 | A1 | 5/2020 | Aronovich et al. |
| 2020/0169602 | A1 | 5/2020 | Aronovich et al. |

OTHER PUBLICATIONS

R.N. Calheiros, et al.,"CloudSim: a toolkit for modeling and simulation of cloud computing environments and evaluation of resource provisioning algorithms", John Wiley & Sons, Ltd., 2010, pp. 28.

Z. Shen, et al., "CloudScale: Elastic Resource Scaling for Multi-Tenant Cloud Systems", SOCC'11, Oct. 27-28, 2011, Cascais, Portugal, ACM, 2011, pp. 14.

M. Mattess, et al., "Cloud Bursting: Managing Peak Loads by Leasing Public Cloud Services", The University of Melbourne, Australia (2011), See section 1.5, "Resource Provisioning Policies," figure 1.4, & pp. 12-16.

D. Linthicum, "Cloud bursting: How will it affect your billing requirements?", TechTarget Network, [online] https://searchtelecom.techtarget.com/tip/Cloud-bursting-How-will-it-affect-your-billing-requirements, Jul. 2013, pp. 4.

M. Rouse, "Cloud Bursting", TechTarget, [online][retrieved Oct. 13, 2018], pp. 1, https://searchcloudcomputing.techtarget.com/definition/cloud-bursting?vgn . . . .

D. Linthicum, "Why hybrid cloud bursting went nowhere", InfoWorld, Mar. 9, 2018, [online][retrieved Oct. 13, 2018] pp. 3, https://www.infoworld.com/article/3261567/hybrid-cloud/why-hybrid-cl . . . .

U.S. Appl. No. 16/199,944, filed Nov. 26, 2018.

U.S. Appl. No. 16/199,903, filed Nov. 26, 2018.

List of Patents or Patent Applications Treated as Related, dated Nov. 26, 2018, pp. 2.

Machine Translation of CN106446959 dated Nov. 26, 2018, pp. 16.

Machine Translation of CN102801792 dated Nov. 26, 2018, pp. 8.

Office Action dated Feb. 18, 2020, pp. 21, for U.S. Appl. No. 16/199,944.

Response dated May 1, 2020, pp. 10, to Office Action dated Feb. 18, 2020, pp. 21, for U.S. Appl. No. 16/199,944.

Response dated Jul. 23, 2020, pp. 12 to Office Action dated Apr. 24, 2020, pp. 29, for U.S. Appl. No. 16/199,903.

Notice of Allowance dated Aug. 11, 2020, pp. 12, for U.S. Appl. No. 16/199,944.

Notice of Allowance dated Aug. 31, 2020, pp. 32, for U.S. Appl. No. 16/199,903.

* cited by examiner

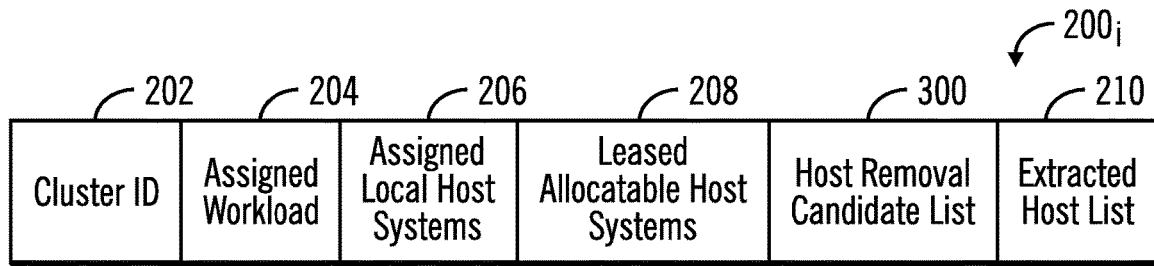
Cluster Information  FIG. 2
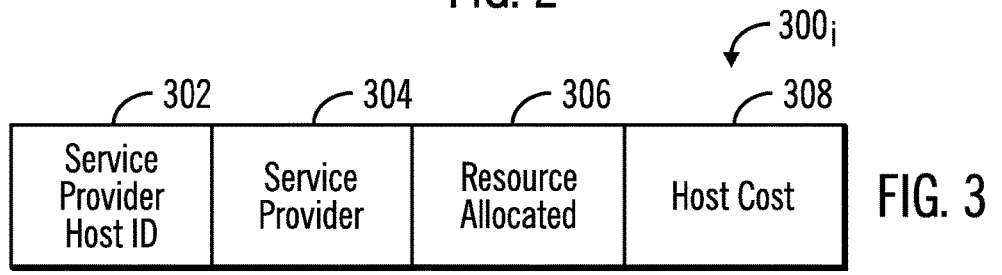
Host Removal Candidate  FIG. 3
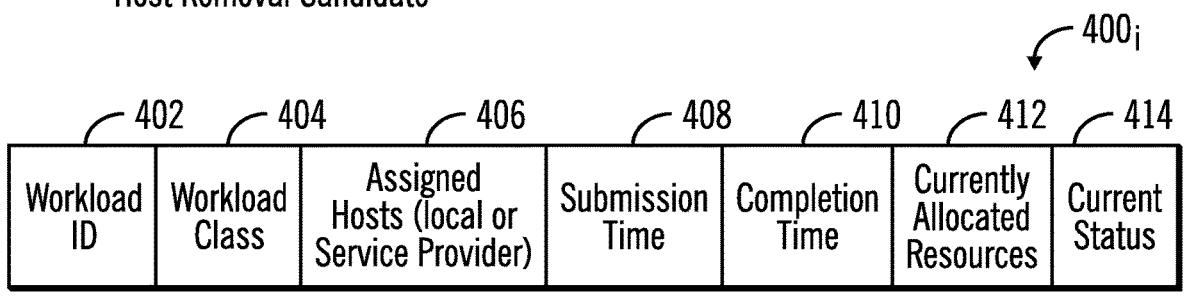
Workload Information  FIG. 4
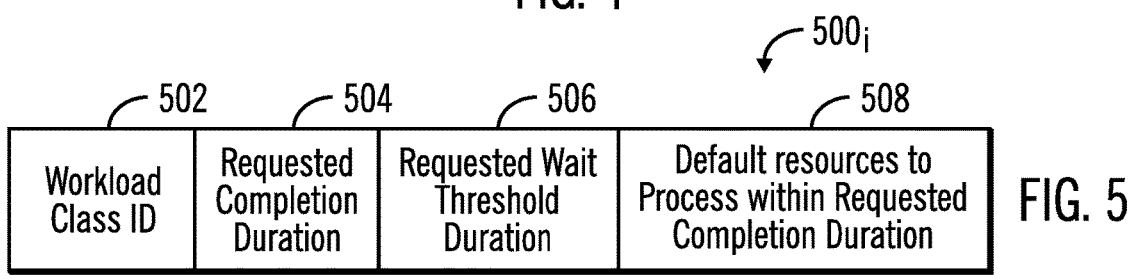
Workload Class Parameters  FIG. 5
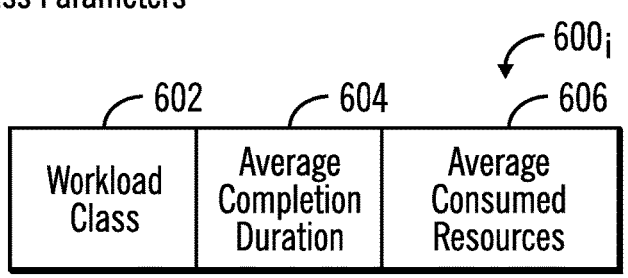
Workload Class Profile Information  FIG. 6

ESTIMATING RESOURCE REQUESTS FOR WORKLOADS TO OFFLOAD TO HOST SYSTEMS IN A COMPUTING ENVIRONMENT

BACKGROUND OF THE INVENTION

1. Field of the Invention

The present invention relates to a computer program product, system, and method for estimating resource requests for workloads to offload to host systems in a computing environment.

2. Description of the Related Art

Cloud bursting is the operation of offloading workloads from local hosts to remote cloud hosts. When workload resource demand exceeds a capacity of resources in local host systems in a cluster, additional cloud hosts are requested from a service provider providing cloud computing resources to provision and add to the cluster to meet the resource demand. When there is excess capacity in allocated cloud hosts, this excess capacity is returned to the cloud providers.

Cloud bursting provides cost savings to a user because rather than spend money to build and maintain infrastructure to accommodate spikes in resource usage that occur only occasionally, the cloud bursting mechanism enables a user to offload workload from the local infrastructure to cloud hosts, and therefore pay for the additional infrastructure only when it is needed, thereby reducing the total cost of ownership. Another benefit is the flexibility to use multiple cloud providers and different types of infrastructures and resources, depending on considerations such as workload requirements and cost.

Cloud computing service providers may also offer increased security, isolation of servers, and communication over a private network. Combining local and cloud resources can address security and compliance aspects.

The cloud bursting mechanism provides scalability by extending the cluster dynamically to cloud providers. In addition, by leveraging resources of cloud providers using the cloud bursting mechanism, the exposure to outages and downtime can be minimized.

There is a need in the art for improved techniques for managing the allocation of cloud resources to a cluster.

SUMMARY

Provided are a computer program product, system, and method for estimating resource requests for workloads to offload to host systems in a computing environment. A calculation is made of computational resources required to complete processing a plurality of unfinished workloads that have not completed. A determination is made of allocated resources that are not yet provisioned to workloads. The required resources are reduced by the allocated resources not yet provisioned to determine resources to provision. The resources to provision for the unfinished workloads are requested.

With the above embodiment, computational resources required for workloads in a system are calculated to ensure the provisioning of an accurate amount of resources so as not to under or over provision the resources required for unfinished workloads. This improves computer technology for calculating resources to provision by calculating required resources to complete processing the unfinished workloads and reducing the required resources by allocated resources not yet provisioned to determine the additional resources that are needed for the unfinished workloads.

In a further embodiment, the unfinished workloads execute in a cluster comprising a local computing system and an allocatable computing system accessible to the local computing system. To request resources to provision, a request is submitted to a resource service, providing resources in the allocatable computing system, for the resources to provision in the allocatable computing system.

In a further embodiment, the allocatable computing system and the resource service are accessible to the local computing system over a network.

With the above embodiments, the resources to provision are requested from a service provider to provision from an allocatable computing system to allow resources to be leased from the service provider.

In a further embodiment, a determination is made of unfinished workloads in the cluster that are eligible to execute with resources in the allocatable computing system. The unfinished workloads for which required resources are calculated comprise unfinished workloads in the cluster that are determined to be eligible to execute in the allocatable computing system.

With the above embodiment, the determination of resources to request is improved by determining those unfinished workloads in the cluster that are eligible to execute in allocatable computing systems so that only those unfinished workloads suitable to offload to allocatable computing systems are considered in determining the resources to request from the service provider to allocate from the allocatable computing systems.

In a further embodiment, a determination is made of workloads that have been waiting for more than a threshold duration, all waiting workloads, and all waiting and running workloads in a waiting state for more than a wait duration threshold. The determined workloads are eligible to execute with resources in the allocatable computing system.

In a further embodiment, the unfinished workloads for which required resources are calculated have at least one workload state of workload states comprising waiting for processing, running, and waiting for processing more than a specified amount of time.

In a further embodiment, the calculating the required resources for a specific unfinished workload that is included in the calculated required resources for the unfinished workloads comprises determining a timing multiplier as a function of an average completion duration for completed workloads and a maximum bound on a processing duration for the specific unfinished workload. The timing multiplier is multiplied by average consumed resources comprising average resources consumed by a workload to determine required resources for the specific unfinished workload.

The timing multiplier indicates an average completion duration for a workload adjusted by a maximum bound of what the average duration should be for the specific workload to determine a timing multiplier that adjusts the average consumed resources to meet the workload being considered in the duration remaining to complete the workload, to either increase or decrease the resources that should be directed to the workload based on a remaining duration to complete the workload. In this way, a more accurate determination of the amount of resources required for workloads is determined by adjusting average resources consumed by the timing multiplier reflecting how much more or less than the average completion duration is the remaining duration for the workload being considered.

In a further embodiment, the average completion duration and the average consumed resources are maintained for each workload class of a plurality of workload classes assigned to a cluster. Each workload class has similar processing behaviors, wherein the calculated required resources are provisioned to the cluster to be available for all workload classes executing in the cluster.

With the above embodiment, the estimation of the required resources for a workload is improved by maintaining different average completion duration for workload classes, where workloads in a class have similar processing behaviors and similar average completion duration. Using average completion durations for specific workload classes allows a more accurate determination of the timing multiplier and required resources for a workload to consider for provisioning resources.

In a further embodiment, the function for determining the timing multiplier comprises dividing the average completion duration by a divisor comprising the maximum bound on the processing duration for the specific unfinished workload.

With the above embodiment, the timing multiplier comprises a ratio of the average completion duration and a maximum bound on the processing duration of the workload In a further embodiment, the calculating the required resources for a specific unfinished workload that is waiting to be processed and that is included in the calculated required resources for the unfinished workloads comprises determining a timing multiplier by dividing an average completion duration for completed workloads by a divisor including a requested completion duration for the specific unfinished workload minus a wait duration the specific unfinished workload has been waiting to be processes since being submitted for processing. The timing multiplier is multiplied by average consumed resources comprising average resources consumed by workloads to determine the required resources for the specific unfinished workload.

In a further embodiment, the divisor is further reduced by an estimated provisioning duration to provision resources from a host system located.

In a further embodiment, the calculating the required resources for a specific unfinished workload that is currently running and that is included in the calculated required resources for the unfinished workloads comprises determining a timing multiplier by dividing an average completion duration for completed workloads by a divisor including a requested completion duration for the specific unfinished workload. The timing multiplier is multiplied by average consumed resources comprising average resources consumed by workloads to determine the required resources for the specific unfinished workload.

In a further embodiment, the divisor is further reduced by an estimated provisioning duration to provision resources to the unfinished workloads from the requested completion duration for the specific unfinished workload.

In a further embodiment, resources currently allocated to the specific unfinished workload are subtracted from a result of the multiplying to determine the required resources for the specific unfinished workload.

BRIEF DESCRIPTION OF THE DRAWINGS

FIG. 2 illustrates an embodiment of cluster information.

FIG. 3 illustrates an embodiment of a host removal candidate in a host removal candidate list.

FIG. 4 illustrates an embodiment of an workload.

FIG. 5 illustrates an embodiment of application class parameters for an application class.

FIG. 6 illustrates an embodiment of class profile information for an application class.

DETAILED DESCRIPTION

Figure 1:
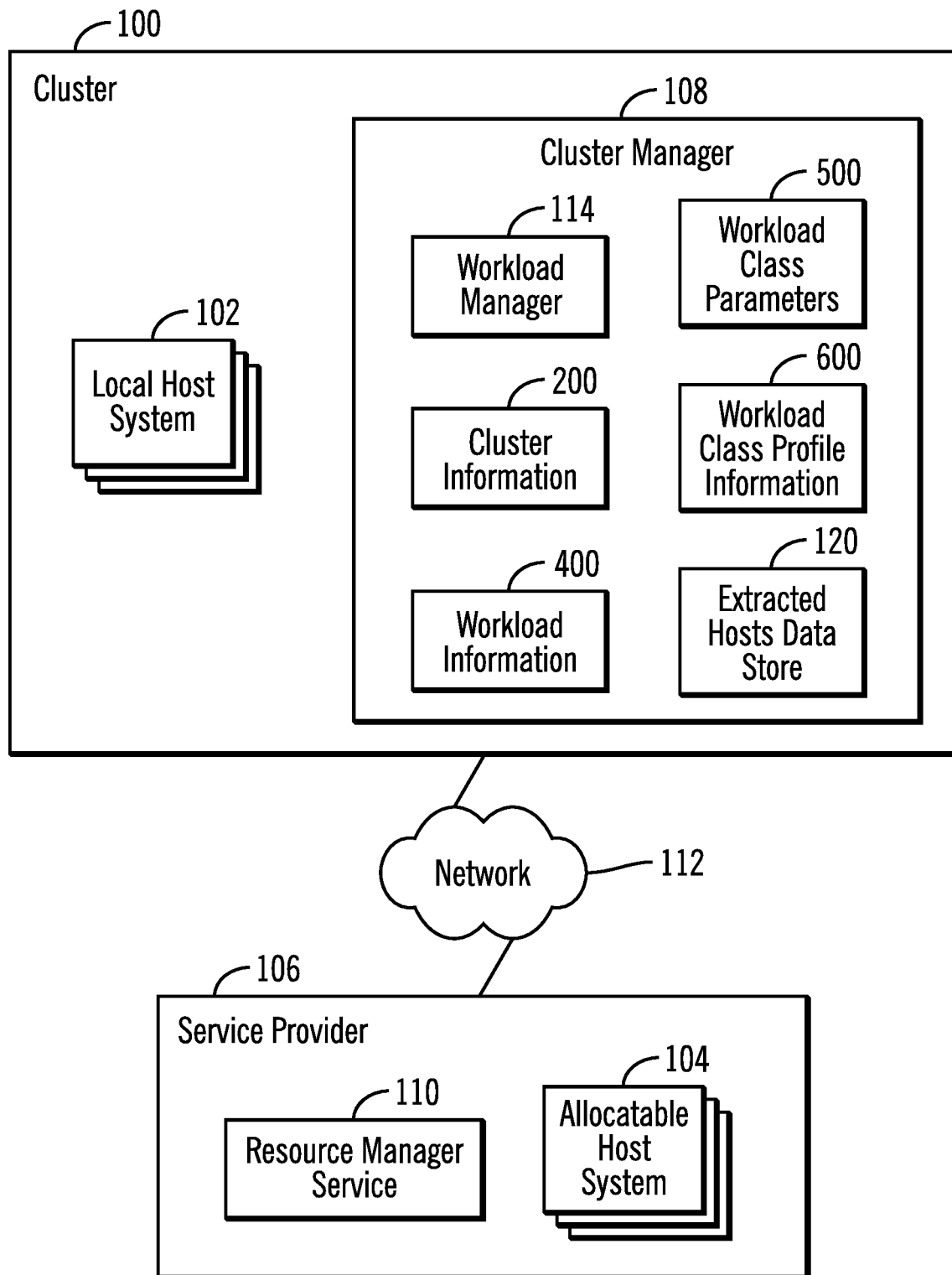
FIG. 1 illustrates an embodiment of a cluster computing environment.

Bursting computational workloads to a cloud environment introduces certain challenges, including identifying situations of shortage of resources in the cluster to meet workload requirements. In situations of resource shortage, the user must calculate the additional resources required to meet workload requirements and minimize costs and in situations of cloud resource excess, the user must determine cloud hosts that could be returned to the service provider to reduce costs and still meet workload requirements. Existing commercial systems for cloud bursting rely heavily on the administrator to identify situations of shortage of resources or excess of resources, via monitoring tools, and to request the addition or return of resources.

Described embodiments provide improvements to the computer technology for allocating resources from allocatable host systems in a computing environment by providing improved technology for automatically calculating workload class profile information having information per workload class on workload processing characteristics in a cluster, such as completion duration and consumed resources for the workload class. Workload processing and resource allocation in a computing system are determined and an aggregate completion duration for workloads are updated with a completion duration for determined workloads that have completed processing. Further, average consumed resources comprising an aggregate of resources consumed by workloads by class are updated by resources consumed by the determined workloads. This updated profile information of the aggregate completion duration and the average consumed resources by application class of the workloads in the cluster are then used to determine resources to provision for the determined workloads.

Described embodiments provide improvements for computer technology to determine an amount of resources to request from a service provider for workloads in a cluster. A determination is made of required resources of computational resources required to complete processing pending workloads that have not yet started to run in the cluster and a plurality of unfinished workloads that are running in the cluster. A determination is then made of available resources that may be assigned to complete processing the unfinished workloads. The required resources are optionally reduced by the total number of resources in allocatable host systems that were requested by the cluster but not yet provisioned, and in allocatable host systems that were provisioned but have not yet joined the cluster, and the current free resources in the hosts in the cluster. A request is then made of the resources to provision for the pending and unfinished workloads to a service provider, which may then allocate and provision to the cluster on which the workloads can be offloaded to extend the processing capability of the cluster.

Described embodiments provide improvements to computer technology for determining allocatable host systems to remove from the cluster and return to a service provider when there is excess capacity in the host systems. A determination is made of unused allocatable host system resources that are not currently being used by workloads. A determination is then made of required resources for computational resources required to complete processing of pending and running/unfinished workloads. A determination is then made of an amount of resources to remove from the cluster by subtracting the unused host system resources by the required resources for computational resources. At least one of the allocatable host systems available for the workloads is removed from the cluster having resources that satisfy the amount of resources to remove.

With the described embodiments, a workload manager in the cluster may automatically perform the operations to update profiling information for workload classes and calculate an amount of resources that are needed based on current workload processing requirements indicated in updated workload class profiling information. Further, the workload manager may then automatically determine allocatable host systems to return to a service provider based on the workload class profile information continually updated based on workloads by workload class in the cluster. Described embodiments provide computer technology to optimize the operations to determine additional allocatable host system resources to request from a resource service provider and determine allocatable host systems that may be returned to the service provider.

FIG. 1 illustrates an embodiment of a cluster computing environment having a cluster 100 that is assigned local host systems 102 and allocatable host systems 104 available to allocate to workloads through a service provider 106, such as a cloud computing service over a network 112, also referred to as an external computing environment. The external computing environment 106 having the source of allocatable hosts can be physically local or remote over a network 112 with respect to the cluster 100, but are not operationally part of the cluster 100. Certain of the local host systems 102 may also comprise allocatable host systems 104. The cluster 100 includes a cluster manager 108 to manage the distribution of workloads to local host systems 102 and to request additional allocatable host systems 104 from the service provider 106 if needed to handle the workload assigned to the cluster 100. The cluster manager 108 may perform cloud bursting by offloading workload to allocatable host systems 104, which may comprise cloud host systems. The workloads may originate from other computing systems that submit the workload to the cluster manager 108 to manage. A resource manager service 110, such as a cloud service, at the service provider 106, responds to requests from systems, such as the cluster manager 108, to purchase allocatable host system 104 resources to use to offload cluster workload to cloud computing resources.

The cluster manager 108 and local host systems 102 may communicate with the allocatable host systems 104 and the resource manager service 110 over a network 112, such as the Internet or an intranet. The cluster 100 and service provider 106 may also have local networks (not shown) to allow communication among the local 102 and service provider 106 host systems, cluster 100, and resource manager service 110.

The cluster manager 108 includes a workload manager 114 to manage the distribution of workloads to the local 102 and allocatable host systems 104. The cluster manager 108 maintains cluster information 200 having information on the hosts in the cluster 100, workload information 400 having information on workloads assigned to the cluster 100, workload class parameters 500 having information on default parameters used for a workload class to determine the allocation of resources in allocatable host systems 104, and workload class profile information 600 having information on gathered statistics for workloads by class.

The workload manager 114 may store determined hosts to extract from the cluster 100 that are pending extraction in an extracted hosts data store 120.

The cluster manager 108 maintains information by workload class, where a class comprises a group of workloads that have similar processing and Input/Output characteristics and resource needs. For instance, an workload class may comprise database applications with similar processing, I/O access profiles, and that share common data sources and users.

Although one service provider 106 is shown, the cluster manager 108 may interface with multiple different cloud service providers, such as Infrastructure as a Service (IaaS) and Platform as a service (PaaS) cloud providers, including by way of example, without limitation IBM Cloud™, Microsoft® Azure®, and Amazon Web Services (AWS), etc. (IBM and IBM Cloud are trademarks of International Business Machines Corporation (IBM) throughout the world, Amazon Web Services and AWS are trademarks of Amazon Technologies, Inc. throughout the world, and Microsoft and Azure are trademarks of Microsoft Corporation throughout the world).

Figure 12:
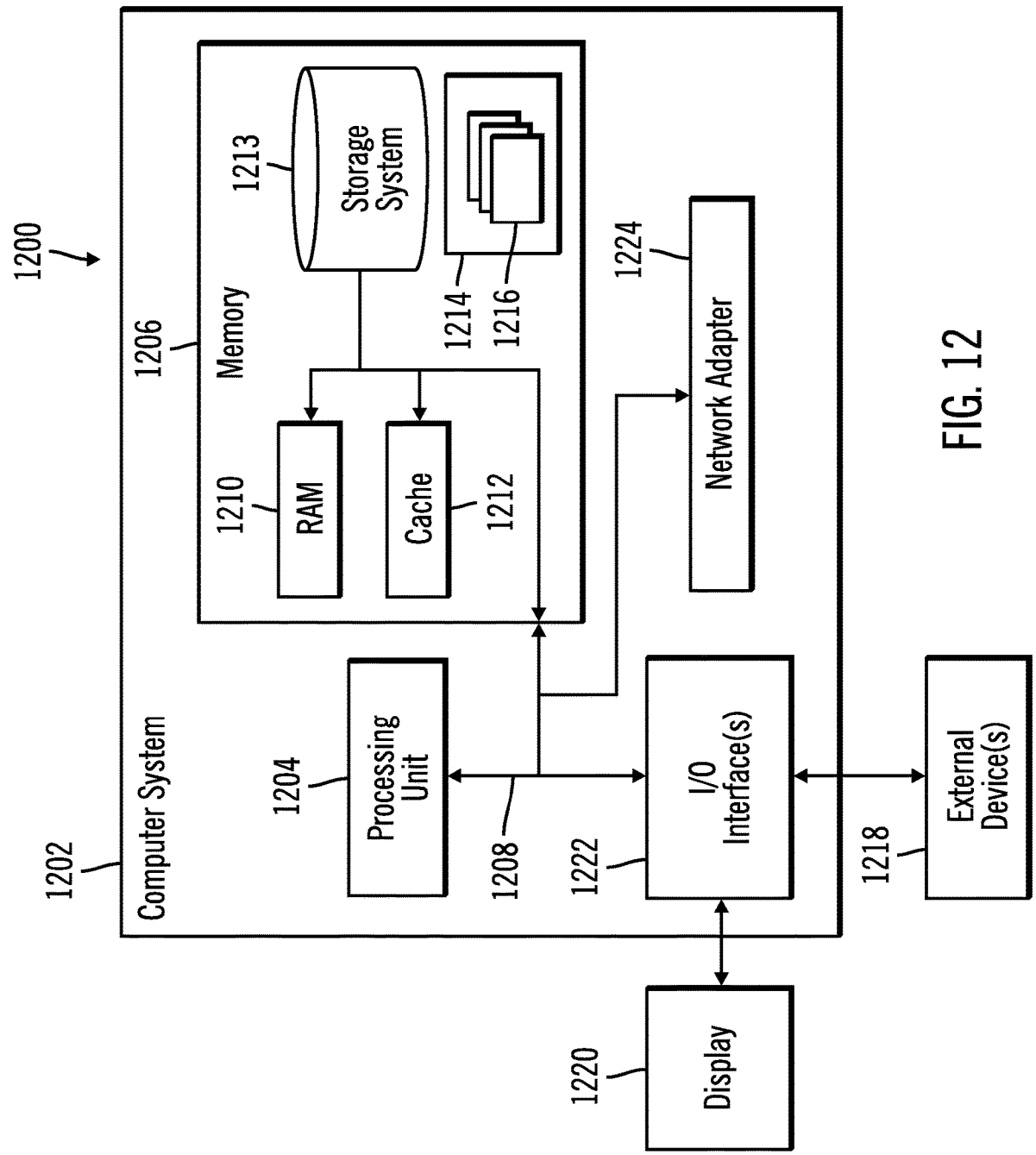
FIG. 12 depicts an embodiment of a cloud computing node.

The local 102 and service provider 106 host systems include processing resources, including processors, storage, network adaptors, video processing, etc., and includes components such as shown in FIG. 12. A resource may consist of any defined combination and amount of various resources, such as processor cores, portion of memory and storage, I/O capacity, networking capacity, and any other quantifiable computing resource offered in the local 102 and service provider 106 host systems, where the local host systems 102 may also include service provide host systems allocated from the service provider to the local location or site. The resources may include hardware and software/program resources.

The network 112 may comprise a network such as a Storage Area Network (SAN), Local Area Network (LAN), Intranet, the Internet, Wide Area Network (WAN), peer-to-peer network, wireless network, arbitrated loop network, etc. In one embodiment, the resource manager service 110 may implement a cloud computing environment in the network 112 that provides computational resources to a cluster 100 that subscribes to the service provider resources.

The workload manager 114 may comprise program code loaded into memory and executed by a processor. Alternatively, some or all of the functions may be implemented in hardware devices, such as in Application Specific Integrated Circuits (ASICs) or executed by separate dedicated processors.

Although a certain number of instances of elements, such as clusters 100, local host systems 102, cluster manager 108, service provider 106, and allocatable host systems 104, etc., are shown, there may be any number of these elements.

FIG. 2 illustrates an embodiment of an instance of cluster information $200_i$ for one cluster and includes: a cluster identifier (ID) 202 identifying the cluster; assigned workloads 204 of applications and/or application jobs and tasks assigned to execute in the cluster 202; assigned local host systems 206 assigned to execute the workloads 204 in the cluster 202; leased allocatable host systems 208 acquired from the service provider 106 to execute workloads 204, such as for cloud bursting to offload some of the workloads 204 to the cloud; a host removal candidate list 300 of allocatable host systems 104 to remove from the cluster 100 and return to the service provider 106; and an extracted host list 210 of service host systems 104 that have been selected from the host removal candidate list 300 to remove and return to the service provider 106. The host removal candidate list 300 and the extracted host list 210 may be stored in memory or storage. In one embodiment, the workload manager 114 may load the hosts pending extraction from an extracted hosts data store 120 into the extracted host list 210 for host extraction operations.

FIG. 3 illustrates an embodiment of an instance of a host removal candidate $300_i$ in the host removal candidate list 300 to remove from the cluster 100 and return to the service provider 106, and includes: a host ID 302 of the allocatable host system 104 to return; a service provider 304 to which the host system 302 is returned; resources allocated by workloads 306 on the allocatable host system 302; and a host cost 308 charged by the service provider 106 to lease to the cluster 100 that may be charged every billing cycle. The host cost 308 may change over time. A billing cycle comprises a basic unit of time duration by which the service provider 304 charges the host cost 308 to the operator of the cluster 100 for the leased host.

FIG. 4 illustrates an embodiment of an instance of workload information $400_i$ for an workload i assigned to the cluster 100, and includes: an workload ID 402, such as task ID, job ID, etc.; an workload class 404 of the workload 402; assigned hosts 406, both local 102 and service provider 106; a submission time 408 the workload 402 was submitted for execution; a completion time 410 the workload completed executing; currently allocated resources 412 by the executing workload 402; and a current status 414 of the workload, such as waiting, executing, completed, etc.

FIG. 5 illustrates an embodiment of an instance of workload class parameters 500, for a workload class i that are used by the workload manager 114 to determine additional resources that are needed by the workloads in the cluster 100, and includes: a workload class identifier 502 to which the parameters apply; a requested completion duration 504 specifying an upper bound on the duration for a workload of the specified class 502 to complete processing from the submission time 408; a requested wait threshold duration 506 specifying a duration beyond which a workload of the specified class 502 that is waiting to start processing will be eligible for offloading to a service provider host system 104, such as via cloud bursting; and a default number of resources to process a workload within the requested completion duration 504 for use if currently allocated resources 412 are not available for the workload of the specified class 502.

FIG. 6 illustrates an embodiment of an instance of workload class profile information $600_i$ of gathered statistics for workloads for a particular class i, and includes: a workload class ID 602 for which the information is provided; and average completion duration 604 of an average time workloads of the class 602 take to complete processing the workload, which is the average duration for completing processing of a workload of the class from the time of submission to the time of completing the processing of the workload, over the sampled workloads of the class; an average number of consumed resources 606 of an average resources consumed by workloads of the class 602, which is the average number of resource consumed by a workload of the class during its processing time, over the sampled workloads of the class. This average number of resource enables the workloads of the class to complete within the average duration for completing processing.

Figure 7:
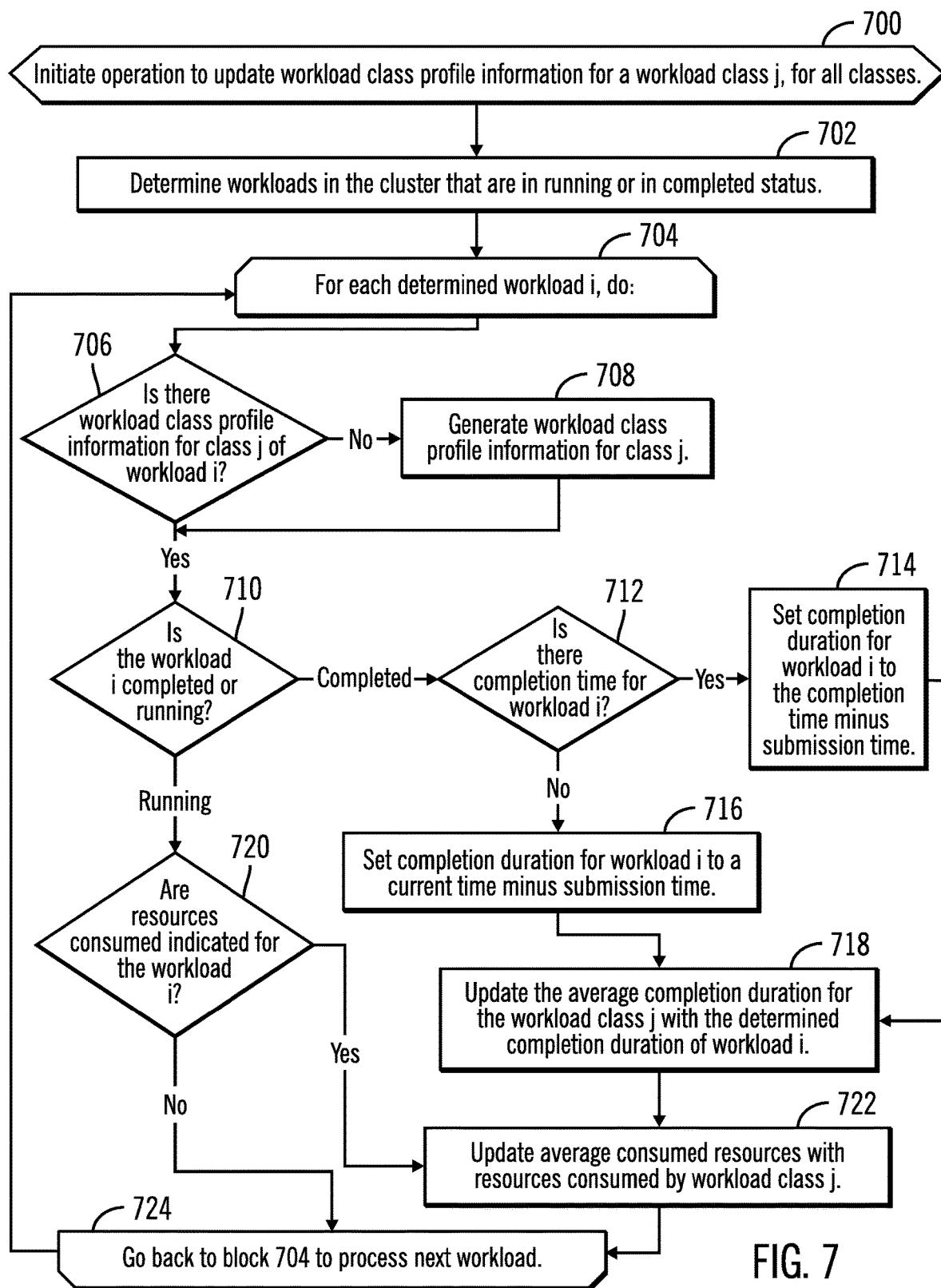
FIG. 7 illustrates an embodiment of operations to update class profile information for an application class.

FIG. 7 illustrates an embodiment of operations performed by the workload manager 114 to periodically update the workload class profile information 600 which is used to determine whether to request additional resources from a service provider 106 or to return allocatable host systems 104 to the service provider 106. The operations of FIG. 7 may be performed for all workload classes in the cluster at some predetermined interval or when system resource permits have greater availability to perform an update, or perform the update before the class profile information 600 is needed to determine additional resources to request from the service provider 106 or needed to determine excess host systems 104 to return to the service provider 106. Upon initiating (at block 700) an operation to update the class profile information $600_j$, the workload manager 114 determines (at block 702) workloads $400_i$, indicated in field 404, that have a status 414 indicating completed or running.

A loop of operations is performed from blocks 704 through 726 for each of the determined workloads $400_i$. If (at block 706) there is no workload class profile information $600_j$ for class j of the determined workload class i, then the workload class profile information $600_j$ is generated (at block 708) for class j. If (at block 706) there is workload class profile information 600j or after generating workload class profile information $600_j$ and if (at block 712) the workload i has completed, as indicated in status field 414, then the completion duration is set (at block 705) to the completion time 410 minus the submission time 408. If (at block 712) the workload i has not completed, i.e., there is no completion time 410 provided for the workload i, then the completion time 410 for workload i is set (at block 716) to a current time, such as system 108 time, minus the submission time 408. The current time can be used in this case as the completion time 410 if there is an indication that this is the first time that workload i has been observed by the method in the complete state. If there is no such indication then the completion duration is not set for workload i, and the average completion duration of workload class j is not updated. The average completion duration 604 is updated (at block 720) to include the determined completion duration for workload i in the average. If the workload class j profile information $600_j$ was just created, then the average completion duration 604 is set to the determined completion duration at blocks 714 or 716.

If (at block 710) workload i is running and if (at block 720) currently allocated resources 412 are indicated for workload i $400_i$ or after updating the average completion duration (at block 718), the workload manager 114 updates (at block 722) the average consumed resources 606 for workload class j with the currently allocated resources 412 used by workload i. For running workloads, the currently allocated resources 412 comprise those that have been consumed while the workload i is running. From block 722 or if (at block 702) no resources are indicated for the workload i, then control proceeds (at block 724) to perform another iterations of the operations for a next workload until all the determined workloads have been considered and incorporated into the class profile information $600_j$.

With the embodiment of operations of FIG. 7, the workload class profile information $600_j$ concerning the average completion duration 604 and average consumed resources 606 for a workload class 602 are updated and maintained current to provide accurate workload class profile information for the determinations of resources that need to be added from the service provider 106. Further, the workload class profile information $600_i$ is based on the most current information for the workloads in a class.

In further embodiments, the gathered and computed statistics, such as the average completion duration and average consumed resources may comprise aggregates of values in addition to an average.

The frequency for updating the workload profiling information can be different and independent of the frequency of applying any calculations of adding or returning allocated resources. The frequency for updating the workload class profile information can depend on the cost of the update process, and on the level of requirement of having the profiling information more up-to-date.

If profiling information is not maintained or is not available when needed for a calculation, then the default resources 508 may be used for a workload class, so different workload classes have different default resources 508. A number of resources required for completion can be also specified as a global default, to be used for any input workload whose associated class is not specified.

Figure 8:
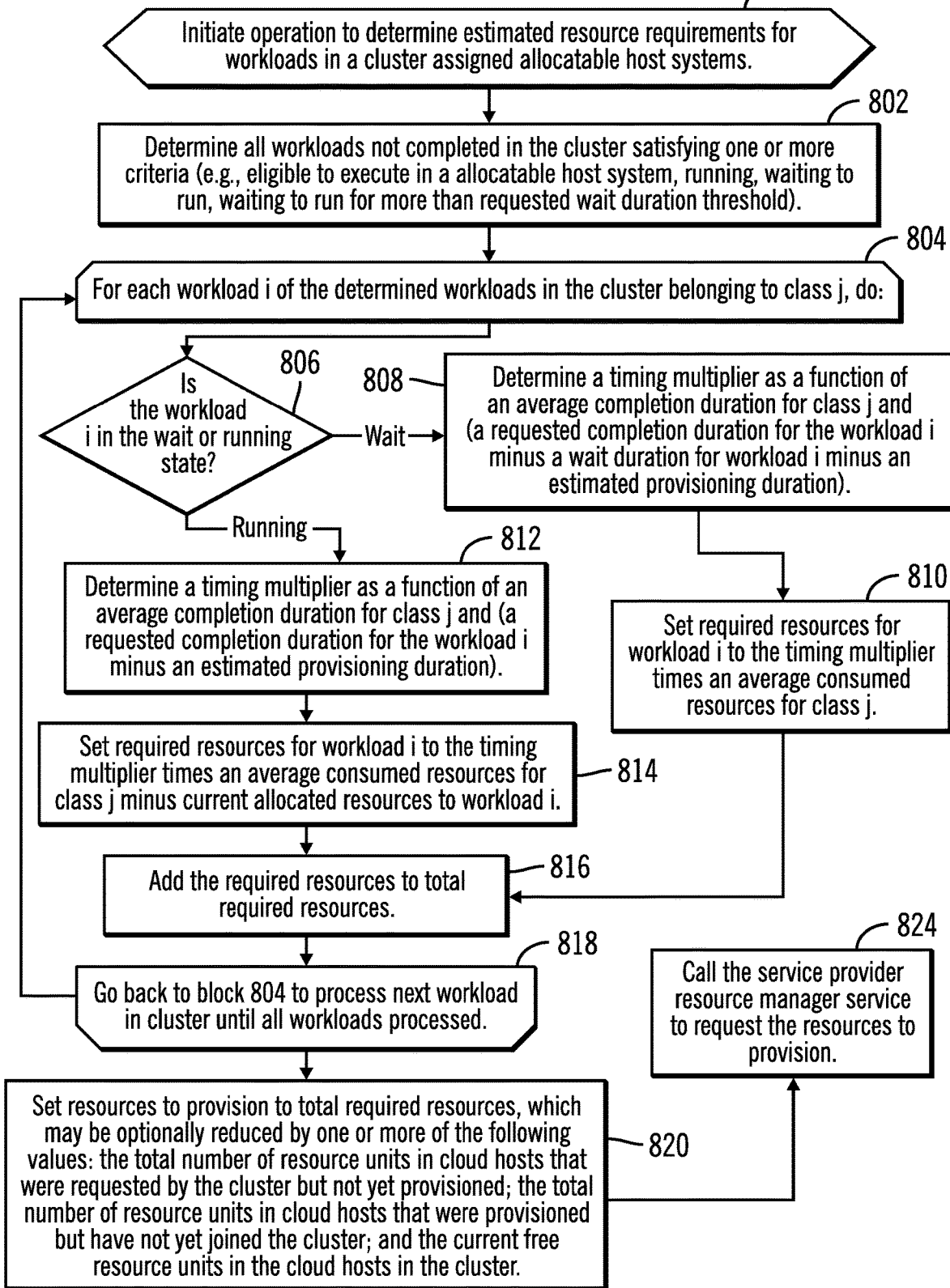
FIG. 8 illustrates an embodiment of operations to determine estimated resource requirements for workloads to offload to a allocatable host system.

FIG. 8 illustrates an embodiment of operations performed by the workload manager 114 to determine whether allocatable host system 104 resources need to be requested to offload or cloud burst workload to allocatable host systems 104. Upon initiating (at block 800) an operation to determine estimated resource requirements for workloads in a cluster, the workload manager 114 determines (at block 802) all workloads $400_i$ not completed, i.e., having a status 414 of running or waiting, in the cluster, such as indicated in cluster field 204, satisfying one or more criteria such as eligible to execute in a allocatable host system 104, having a running state, waiting state, waiting state for more than requested wait duration threshold, etc. In certain embodiments, a workload $400_i$ may be eligible to offload to allocatable host system 104 resources if the workload has been waiting for more than the requested wait threshold duration 506 for the workload class 404. A loop of operations is performed at blocks 804 through 818 for each determined unfinished workload i in the cluster in workload class j that is eligible to offload, e.g., cloud burst.

At block 806, if the workload i is in the wait state 414, then the workload manager 114 determines (at block 808) a timing multiplier as a function of an average completion duration 604 and a requested completion duration 504 for workload class j minus a wait duration for workload i minus an estimated provisioning duration. The estimated provisioning duration is an estimated duration to provision a host system 104 from the service provider 106. The estimated provisioning duration may be set to an average duration or a maximal duration, or if unknown, to a zero duration. Alternatively, this value can be also included in the requested completion duration 504 for the class. The required resources for waiting workload i is set (at block 810) to the timing multiplier times an average consumed resources 606 for class j. Equation (1) below provides an embodiment of the calculation of required resources for a waiting workload i:

$$[(\text{Average Completion Duration})/(\text{Requested Completion Duration}-\text{Wait Duration}-\text{Estimated Provisioning Duration})]\times(\text{Average Consumed Resources}) \quad (1)$$

The timing multiplier comprises the ratio of the average completion duration for the class and a maximum bound on the processing duration of the workload.

If (at block 806) the unfinished workload i is in the running state, then the workload manager 114 determines (at block 812) a timing multiplier as a function of an average completion duration 604 and a requested completion duration 504 for class j minus the estimated provisioning duration. The required resources for running workload i is set (at block 814) to the timing multiplier times an average consumed resources 606 for class j minus the currently allocated resources 412 for running workload i. Equation (2) below provides an embodiment of the calculation of required resources for a running workload i:

$$[(\text{Average Completion Duration})/(\text{Requested Completion Duration}-\text{Estimated Provisioning Duration})]\times(\text{Average Consumed Resources})- \text{Currently Allocated Resources for Workload} \quad (2)$$

The required resources for workload i, determined at block 810 or 814, are then added (at block 816) to a total required resources being calculated for the cluster 100. Control then proceeds (at block 818) to back block 804 to process a next workload in the cluster until all the determined workloads satisfying the criteria are processed and incorporated into to the total required resources for the cluster. After determining the total required resources from all the workloads for the cluster 100, the workload manager 114 sets (at block 820) resources to provision to total required resources, which may be optionally reduced by one or more of the following values: the total number of resource in cloud hosts that were requested by the cluster but not yet provisioned; the total number of resources in cloud hosts that were provisioned but have not yet joined the cluster; and the current free resources in the cloud hosts in the cluster. The workload manager 114 calls, i.e., sends, (at block 824) a command, to one or more resource manager services 110 to request allocatable host system resources to provision to offload the determined workloads to allocatable host system resources.

The embodiment of FIG. 8 provides improvements to computer technology for determining allocatable host system resources that are needed to offload workloads to computing centers, such as cloud computing centers. The described embodiments estimate the total resources required by workloads eligible to cloud burst or offload to allocatable host systems 104 by considering calculated values, such as average completion duration for a class, and average consumed resources for a class, and currently consumed resources that are periodically updated to reflect current workload conditions. In this way, the estimated resources to provision are based on the current operating conditions in the cluster 100, including the state of workloads and their consumption of resources. This provides an accurate measure of allocatable host resources to request to avoid incurring costs in overprovisioning more resources than needed and to avoid negative impacts to performance by not provisioning a sufficient number of resources to handle increasing workload in the cluster 100, which is measured according to the operations of FIG. 7 that update the class profile information 600 for classes of workloads in the cluster 100.

Figure 9:
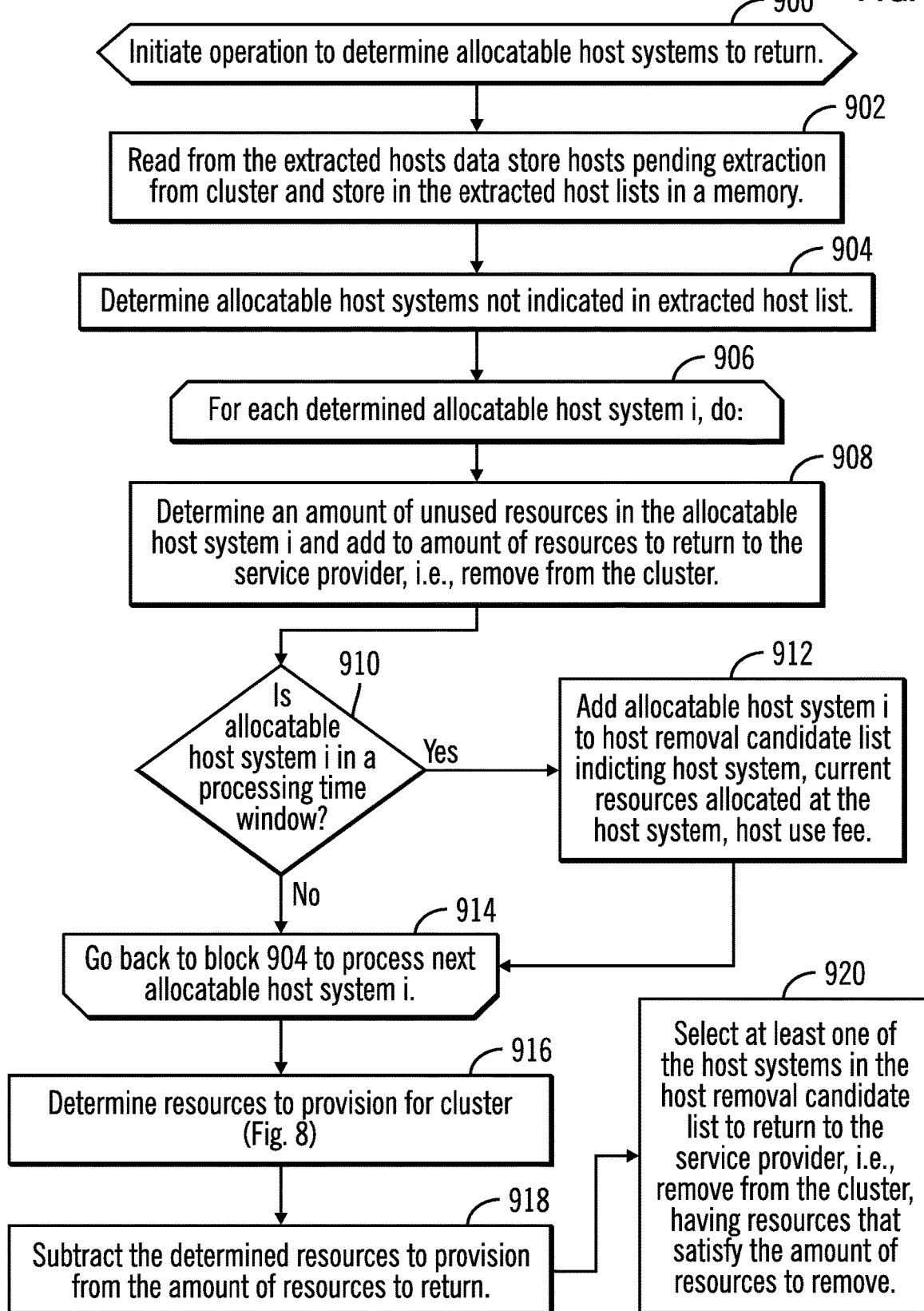
FIG. 9 illustrates an embodiment of operations to determine allocatable host systems to return and indicate in a host removal candidate list.
Figure 10:
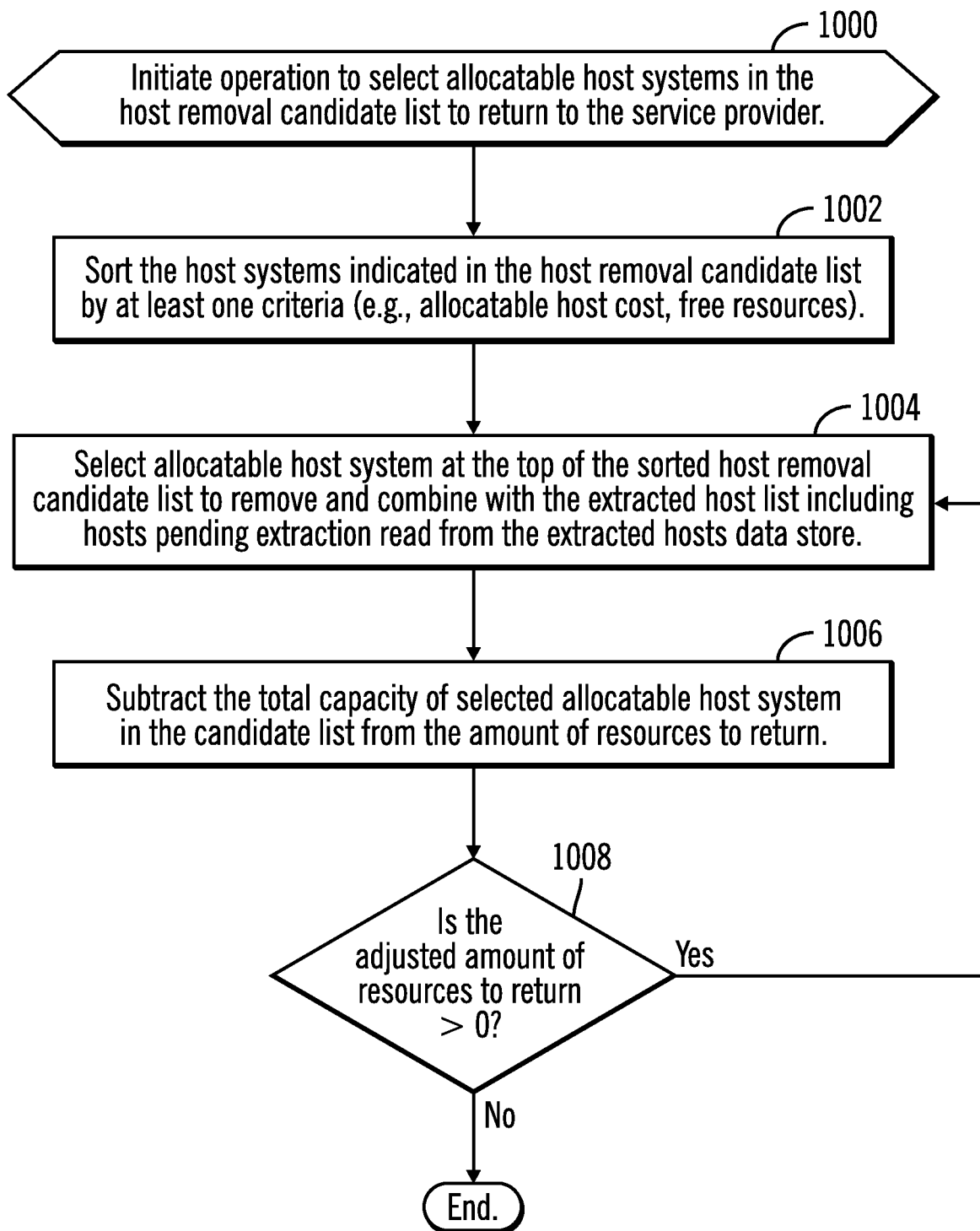
FIG. 10 illustrates an embodiment of operations to select host systems from the host removal candidate list to add to the extracted host list.
Figure 11:
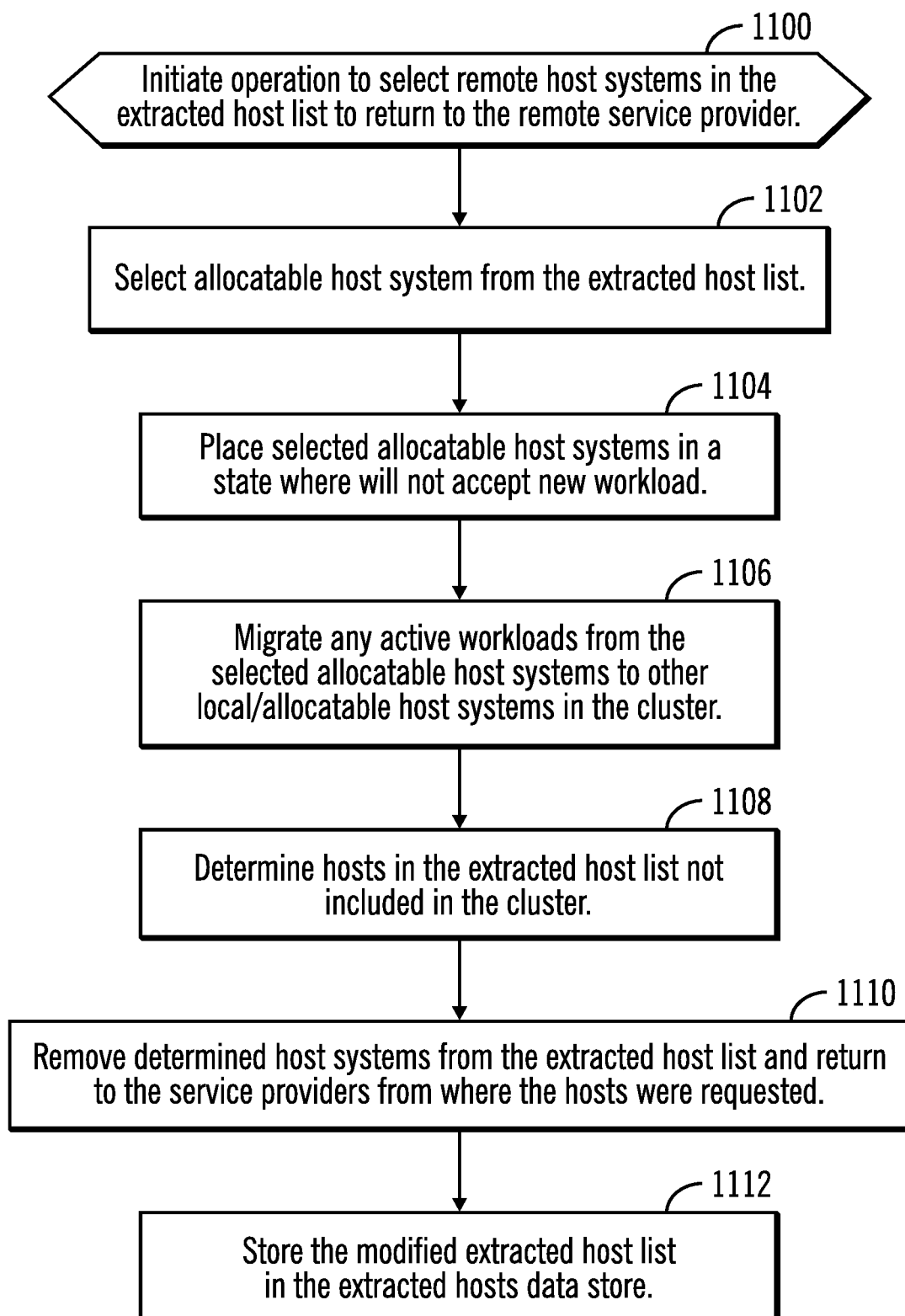
FIG. 11 illustrates an embodiment of operations to select host systems in the extracted host list to prepare for return to the host service provider and removal from the cluster.

FIGS. 9, 10, and 11 illustrate an embodiment of operations performed by the workload manager 114 to determine resources of allocatable host systems 104 to remove from the cluster 100 and return to the service provider 106.

FIG. 9 illustrates an embodiment of operations to determine allocatable host systems 104 to return. Upon initiating (at block 900) the operation to determine the allocatable host systems 104 to return, the workload manager 114 determines reads (at block 902) from the extracted hosts data store 120 hosts pending extraction from cluster and stores in the extracted host lists 210 in a memory. The workload manager 114 determines (at block 904) allocatable host systems 104 not indicated in the extracted host list 210. A loop of operations is performed at blocks 906 through 912 for each determined allocatable host system $104_i$. At block 908, the workload manager 114 determines an amount of unused resources in the allocatable host system $104_i$ and adds to the amount of resources to return to the service provider 106. The workload manager 114 determines (at block 910) whether the allocatable host system $104_i$ is within a processing time window. In one embodiment, the processing time window comprises a predetermined time period during a billing cycle for the allocatable host system $104_i$, such as at an end of the billing cycle or elsewhere in the billing cycle. This allows for the return of the allocatable host system $104_i$ before the cluster operator is billed again the allocatable host cost for the next billing cycle. If (at block 910) the allocatable host system $104_i$ is within the processing time window, then the allocatable host system $104_i$ is added (at block 912) as an entry $300_j$ to the host removal candidate list 300 for the cluster 100, which entry $300_j$ indicates the allocatable host system $104_i$ identifier in field 302, the service provider 304, the current resources allocated 306 in the allocatable host system $104_i$, and the allocatable host cost 308 changed by the service provider 304. From block 912 or if the allocatable host system $104_i$ is not within the processing time window (no branch of block 910) then control proceeds (at block 914) back to block 906 until all the determined allocatable host systems are considered.

The workload manager 114 may then determine (at block 916) the resources to provision for the cluster, which is determined according to the operations of FIG. 8. The determined resources to provision are subtracted (at block 918) from the amount of resources to return to the service provider, determined at block 906. The workload manager 114 then selects (at block 920) at least one of the host systems $300_j$ in the host removal candidate list 300 to return to the service provider, i.e., remove from the cluster, having resources that satisfy the amount of resources to remove. FIG. 10 provides further details on how to select a allocatable host system from the host removal candidate list 300.

In the embodiment of FIG. 9, the amount of resources to return to the service provider 106 is calculated from all allocatable host systems 104 allocated to the cluster 100 not already included in the host removal candidate list 300. In an alternative embodiment, unused resources are added to the amount of resources to return for only allocatable host systems added to the host removal candidate list 300. With the embodiment of FIG. 9, only allocatable host systems 104 meeting certain conditions to be eligible to return to the service provider 106 are added to a list of allocatable host systems to return and remove from the cluster. Further, when considering allocatable host systems 104 as candidates to return, the amount of resources to return is calculated as those resources in considered allocatable host systems. The resources needed to provision for current workload is then subtracted from the amount of resources to return so that resources are not returned that are needed to address unfinished workload assigned to the cluster 100.

FIG. 10 illustrates an embodiment of operations performed by the workload manager 114 to select the most optimal allocatable host systems for return indicated in the host removal candidate list 300 to move to the extracted host list 210 of allocatable hosts to return. Upon initiating (at block 1000) the operation to select a allocatable host system to add to the extracted host list 210, the workload manager 114 sorts (at block 1002) the host systems $300_i$ indicated in the host removal candidate list 300 by at least one criteria, such as the allocatable host cost 308 and resources available 306, because it is preferable to select allocatable hosts 104 to return having a greater amount free resources because there is less content and workloads to migrate to existing systems 206 in the cluster 100 and to return hosts having greater cost to minimize expenses. The allocatable host system at the top of the sorted host removal candidate list 300 is selected (at block 1004) to remove from the host removal candidate list 300 and combined with the extracted host list 210 including hosts pending extraction read from the extracted hosts data store 120. The total capacity of the selected allocatable host system in the host removal candidate list 300 is subtracted (at block 1006) from the amount of resources to return. If (at block 1008) the adjusted amount of resources to return is greater than zero, then control proceeds back to block 1004 to select further allocatable host systems from the host removal candidate list 300 to return. Otherwise, if there are no more resources to return, then control ends.

With the embodiment of FIG. 10, allocatable host systems that are candidates to return are selected for actual return based on a criteria indicating that a allocatable host system would be most optimal to return over other allocatable host systems on the candidate list, such as criteria based on an amount of free responses on the allocatable host system and the cost of the allocatable host system.

FIG. 11 illustrates an embodiment of operations performed by the workload manager 114 to apply pre-return operations on the host systems in the extracted host list 210 and then returning to the service provider 106 the host systems for which the pre-return operations were completed. Upon initiating (at block 1100) selection operations, the workload manager 114 selects (at block 1102) one or more allocatable host systems 104 from the extracted host list 210. To improve performance, these pre-return operations for selected allocatable host systems 104 can be performed in a concurrent and asynchronous manner, and the operations of FIG. 11 applied to selected allocatable hosts in parallel and issued in an asynchronous manner so that the caller does not wait for the operations to complete. Furthermore, each of these operations may encounter an error, and it may be required to repeat any failed operation in a later iteration. The selected allocatable host systems 104 are placed (at block 1104) in a state where they will not accept new workload and any active workloads on the selected allocatable host systems are migrated (at block 1106) to another local/allocatable host system in the cluster 100 that is not on the host removal candidate list 300 or extracted host list 210.

A determination is made (at block 1108) of host systems 104 in the extracted host list 210 that are not included in the cluster 100, i.e., that have completed their pre-return operations at blocks 1104 and 1106. The determined host systems not in the cluster 100 are then removed (at block 1110) from the extracted host list 210 and returned to the service providers 106 from which the hosts were requested, and may further be added to a returned host list. The updated extracted host list 210 is then stored in the extracted hosts data store 120 to provide a persistent copy. The use of separate lists for the host removal candidate list 300 and extracted host list 210 optimizes operations by allowing these operations to independently be performed, and to allow multiple hosts to be selected from the extracted host list 210 for extraction operations.

Cloud Computing Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 12, a schematic of an example of a cloud computing node is shown, such as the local 102 and allocatable host systems 104, the cluster manager 108, and the resource manager service 110, that implement a cloud based storage service requestor and provider. Cloud computing node 1200 is only one example of a suitable cloud computing node and is not intended to suggest any limitation as to the scope of use or functionality of embodiments of the invention described herein. Regardless, cloud computing node 1200 is capable of being implemented and/or performing any of the functionality set forth hereinabove.

In cloud computing node 1200 there is a computer system/server 1202, which is operational with numerous other general purpose or special purpose computing system environments or configurations. Examples of well-known computing systems, environments, and/or configurations that may be suitable for use with computer system/server 1202 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1202 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1202 in cloud computing node 1200 is shown in the form of a general-purpose computing device. The components of computer system/server 1202 may include, but are not limited to, one or more processors or processing units 1204, a system memory 1206, and a bus 1208 that couples various system components including system memory 1206 to processor 1204.

Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. Program modules 1216 generally carry out the functions and/or methodologies of embodiments of the invention as described herein.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 20. As depicted, network adapter 1224 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

Figure 13:
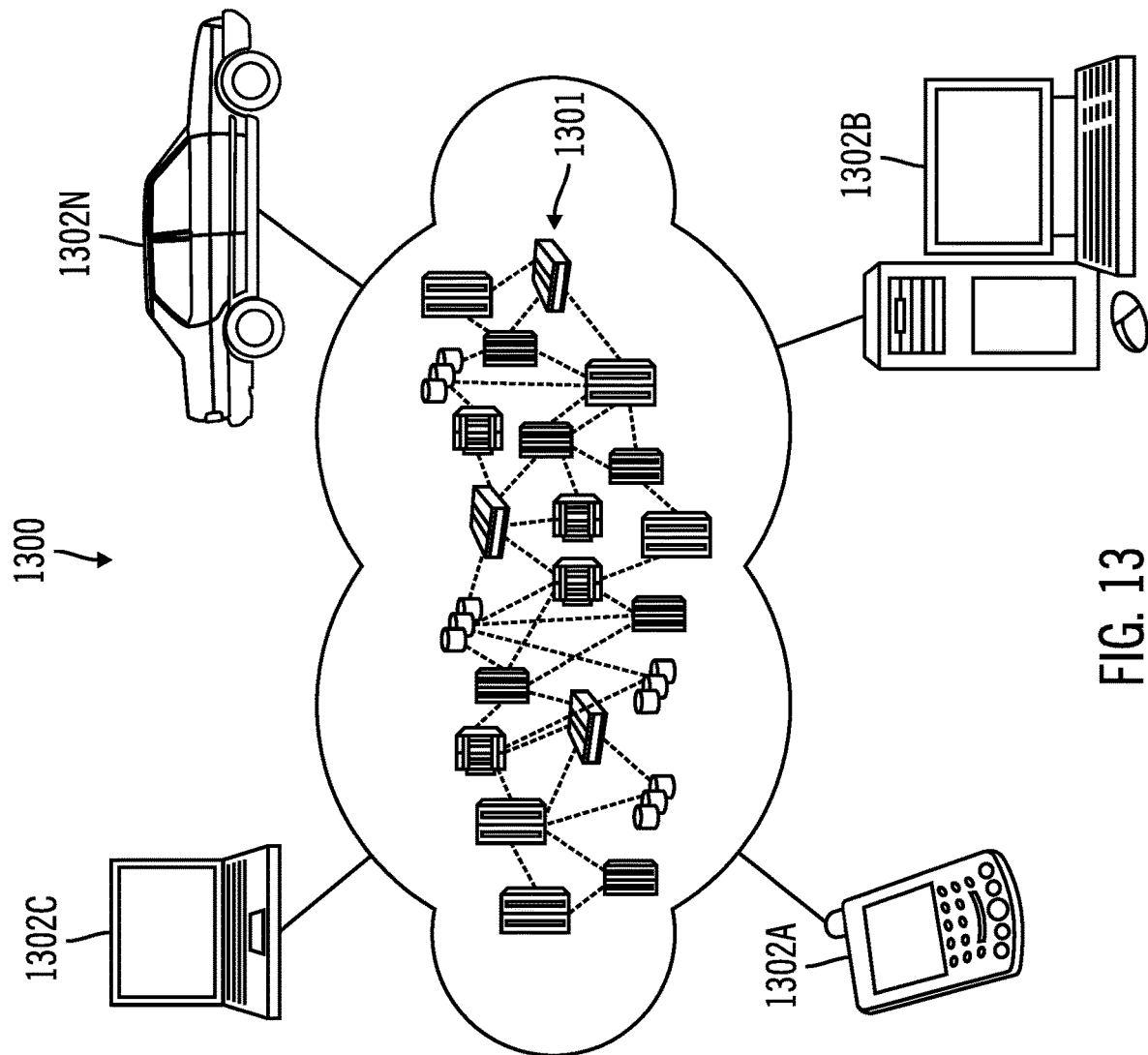
FIG. 13 depicts an embodiment of a cloud computing environment.

Referring now to FIG. 13, illustrative cloud computing environment 1300 is depicted. As shown, cloud computing environment 1300 comprises one or more cloud computing nodes 1301, such as the allocatable host systems 104, with which local computing devices used by cloud consumers, such as, for example, personal digital assistant (PDA) or cellular telephone 1302A, desktop computer 1302B, laptop computer 1302C, and/or automobile computer system 1302N may communicate. The cloud consumers may comprise the cluster 100 that may require to offload or cloud burst workloads to the computing nodes 1301. Nodes 1301 may communicate with one another. They may be grouped (not shown) physically or virtually, in one or more networks, such as Private, Community, Public, or Hybrid clouds as described hereinabove, or a combination thereof. This allows cloud computing environment 1300 to offer infrastructure, platforms and/or software as services for which a cloud consumer does not need to maintain resources on a local computing device. It is understood that the types of computing devices 1302A-N shown in FIG. 13 are intended to be illustrative only and that computing nodes 1301 and cloud computing environment 1300 can communicate with any type of computerized device over any type of network and/or network addressable connection (e.g., using a web browser).

Figure 14:
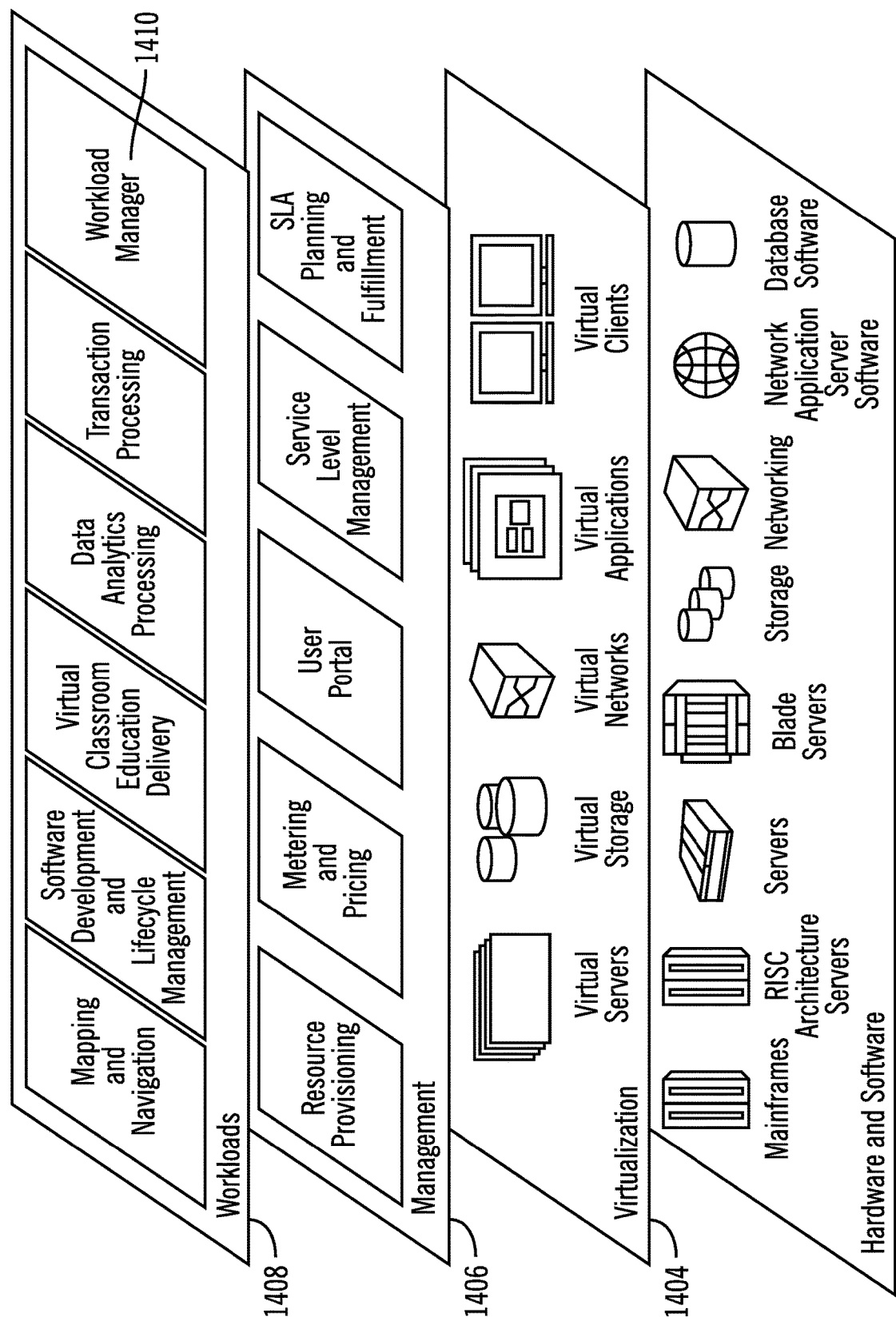
FIG. 14 depicts an embodiment of abstraction model layers of a cloud computing environment.

Referring now to FIG. 14, a set of functional abstraction layers provided by cloud computing environment 1300 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1402 includes hardware and software components. Examples of hardware components include: mainframes; RISC (Reduced Instruction Set Computer) architecture based servers; storage devices; networks and networking components. In some embodiments, software components include network application server software.

Virtualization layer 1404 provides an abstraction layer from which the following examples of virtual entities may be provided: virtual servers; virtual storage; virtual networks, including virtual private networks; virtual applications and operating systems; and virtual clients.

In one example, management layer 1406 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1408 provides examples of functionality for which the cloud computing environment may be utilized. Examples of workloads and functions which may be provided from this layer include: mapping and navigation; software development and lifecycle management; virtual classroom education delivery; data analytics processing; transaction processing; and workload manger 1410, such as workload manager 114, to determine how to allocate workloads 1408 to the allocatable host systems that are provided as part of the cloud computing service.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The reference characters used herein, such as i, are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for allocating computing resources to workloads, wherein the computer program product comprises a computer-readable storage medium having computer readable program instructions executed by a processor to perform operations, the operations comprising:
    calculating required resources of computational resources required to complete processing a plurality of unfinished workloads comprising workloads having a status indicating not completed;
    determining allocated resources that are not yet provisioned to workloads;
    reducing the required resources by the allocated resources not yet provisioned to determine resources to provision; and
    requesting the resources to provision for the unfinished workloads to offload the unfinished workloads to the requested resources to provision.

2. The computer program product of claim 1, wherein the unfinished workloads execute in a cluster comprising a local computing system and an allocatable computing system accessible to the local computing system, wherein the requesting the resources to provision comprises:
    submitting a request to a resource service, providing resources in the allocatable computing system, for the resources to provision in the allocatable computing system.

3. The computer program product of claim 2, wherein the allocatable computing system and the resource service are accessible to the local computing system over a network.

4. The computer program product of claim 2, wherein the operations further comprise:
    determining unfinished workloads in the cluster that are eligible to execute with resources in the allocatable computing system, wherein the unfinished workloads for which required resources are calculated comprise the unfinished workloads in the cluster that are determined to be eligible to execute in the allocatable computing system.

5. The computer program product of claim 4, wherein the operations further comprise:
    determining workloads that have been waiting for more than a threshold duration, all waiting workloads, and all waiting and running workloads in a waiting state for more than a wait duration threshold, wherein the determined workloads are eligible to execute with resources in the allocatable computing system.

6. The computer program product of claim 1, wherein the unfinished workloads for which required resources are calculated have at least one workload state of workload states comprising waiting for processing, running, and waiting for processing more than a specified amount of time.

7. The computer program product of claim 1, wherein the calculating the required resources for a specific unfinished workload that is included in the calculated required resources for the unfinished workloads comprises:
  determining a timing multiplier as a function of an average completion duration for completed workloads and a maximum bound on a processing duration for the specific unfinished workload; and
  multiplying the timing multiplier by average consumed resources comprising average resources consumed by a workload to determine required resources for the specific unfinished workload.

8. The computer program product of claim 7, wherein the average completion duration and the average consumed resources are maintained for each workload class of a plurality of workload classes assigned to a cluster, wherein each workload class has similar processing behaviors, wherein the calculated required resources are provisioned to the cluster to be available for all workload classes executing in the cluster.

9. The computer program product of claim 7, wherein the function for determining the timing multiplier comprises dividing the average completion duration by a divisor comprising the maximum bound on the processing duration for the specific unfinished workload.

10. The computer program product of claim 1, wherein the calculating the required resources for a specific unfinished workload that is waiting to be processed and that is included in the calculated required resources for the unfinished workloads comprises:
  determining a timing multiplier by dividing an average completion duration for completed workloads by a divisor including a requested completion duration for the specific unfinished workload minus a wait duration the specific unfinished workload has been waiting to be processed since being submitted for processing; and
  multiplying the timing multiplier by average consumed resources comprising average resources consumed by workloads to determine the required resources for the specific unfinished workload.

11. The computer program product of claim 10, wherein the divisor is further reduced by an estimated provisioning duration to provision resources from a host system.

12. The computer program product of claim 1, wherein the calculating the required resources for a specific unfinished workload that is currently running and that is included in the calculated required resources for the unfinished workloads comprises:
  determining a timing multiplier by dividing an average completion duration for completed workloads by a divisor including a requested completion duration for the specific unfinished workload; and
  multiplying the timing multiplier by average consumed resources comprising average resources consumed by workloads to determine the required resources for the specific unfinished workload.

13. The computer program product of claim 12, wherein the divisor is further reduced by an estimated provisioning duration to provision resources to the unfinished workloads from the requested completion duration for the specific unfinished workload.

14. The computer program product of claim 12, wherein the operations further comprise:
  subtracting resources currently allocated to the specific unfinished workload from a result of the multiplying to determine the required resources for the specific unfinished workload.

15. A system in communication with a service provider, comprising:
  a processor; and
  a computer-readable storage medium having computer readable program instructions executed by the processor to perform operations, the operations comprising:
    calculating required resources of computational resources required to complete processing a plurality of unfinished workloads comprising workloads having a status indicating not completed;
    determining allocated resources that are not yet provisioned to workloads;
    reducing the required resources by the allocated resources not yet provisioned to determine resources to provision; and
    requesting, from the service provider, the resources to provision for the unfinished workloads to offload the unfinished workloads to the requested resources to provision.

16. The system of claim 15, further in communication with a cluster comprising a local computing system and an allocatable computing system, managed by the service provider, accessible to the local computing system, wherein the unfinished workloads execute in the cluster, and wherein the requesting the resources to provision comprises:
  submitting a request to a resource service, providing resources in the allocatable computing system, for the resources to provision in the allocatable computing system.

17. The system of claim 16, wherein the operations further comprise:
  determining unfinished workloads in the cluster that are eligible to execute with resources in the allocatable computing system, wherein the unfinished workloads for which required resources are calculated comprise the unfinished workloads in the cluster that are determined to be eligible to execute in the allocatable computing system.

18. The system of claim 15, wherein the unfinished workloads for which required resources are calculated have at least one workload state of workload states comprising waiting for processing, running, and waiting for processing more than a specified amount of time.

19. The system of claim 15, wherein the calculating the required resources for a specific unfinished workload that is included in the calculated required resources for the unfinished workloads comprises:
  determining a timing multiplier as a function of an average completion duration for completed workloads and a maximum bound on a processing duration for the specific unfinished workload; and
  multiplying the timing multiplier by average consumed resources comprising average resources consumed by a workload to determine required resources for the specific unfinished workload.

20. The system of claim 19, wherein the average completion duration and the average consumed resources are maintained for each workload class of a plurality of workload classes assigned to a cluster, wherein each workload class has similar processing behaviors, wherein the calculated required resources are provisioned to the cluster to be available for all workload classes executing in the cluster.

21. A method for allocating computing resources to workloads, comprising:

calculating required resources of computational resources required to complete processing a plurality of unfinished workloads comprising workloads having a status indicating not completed;

determining allocated resources that are not yet provisioned to workloads;

reducing the required resources by the allocated resources not yet provisioned to determine resources to provision; and requesting the resources to provision for the unfinished workloads to offload the unfinished workloads to the requested resources to provision.

22. The method of claim 21, wherein the unfinished workloads execute in a cluster comprising a local computing system and an allocatable computing system accessible to the local computing system, wherein the requesting the resources to provision comprises:

submitting a request to a resource service, providing resources in the allocatable computing system, for the resources to provision in the allocatable computing system.

23. The method of claim 22, further comprising:

determining unfinished workloads in the cluster that are eligible to execute with resources in the allocatable computing system, wherein the unfinished workloads for which required resources are calculated comprise the unfinished workloads in the cluster that are determined to be eligible to execute in the allocatable computing system.

24. The method of claim 21, wherein the unfinished workloads for which required resources are calculated have at least one workload state of workload states comprising waiting for processing, running, and waiting for processing more than a specified amount of time.

25. The method of claim 21, wherein the calculating the required resources for a specific unfinished workload that is included in the calculated required resources for the unfinished workloads comprises:

determining a timing multiplier as a function of an average completion duration for completed workloads and a maximum bound on a processing duration for the specific unfinished workload; and multiplying the timing multiplier by average consumed resources comprising average resources consumed by a workload to determine required resources for the specific unfinished workload.

26. The method of claim 25, wherein the average completion duration and the average consumed resources are maintained for each workload class of a plurality of workload classes assigned to a cluster, wherein each workload class has similar processing behaviors, wherein the calculated required resources are provisioned to the cluster to be available for all workload classes executing in the cluster.

* * * * *